March 25, 1941.          F. C. THORPE          2,236,021
TWINE CONE SUPPORT
Filed Sept. 25, 1940
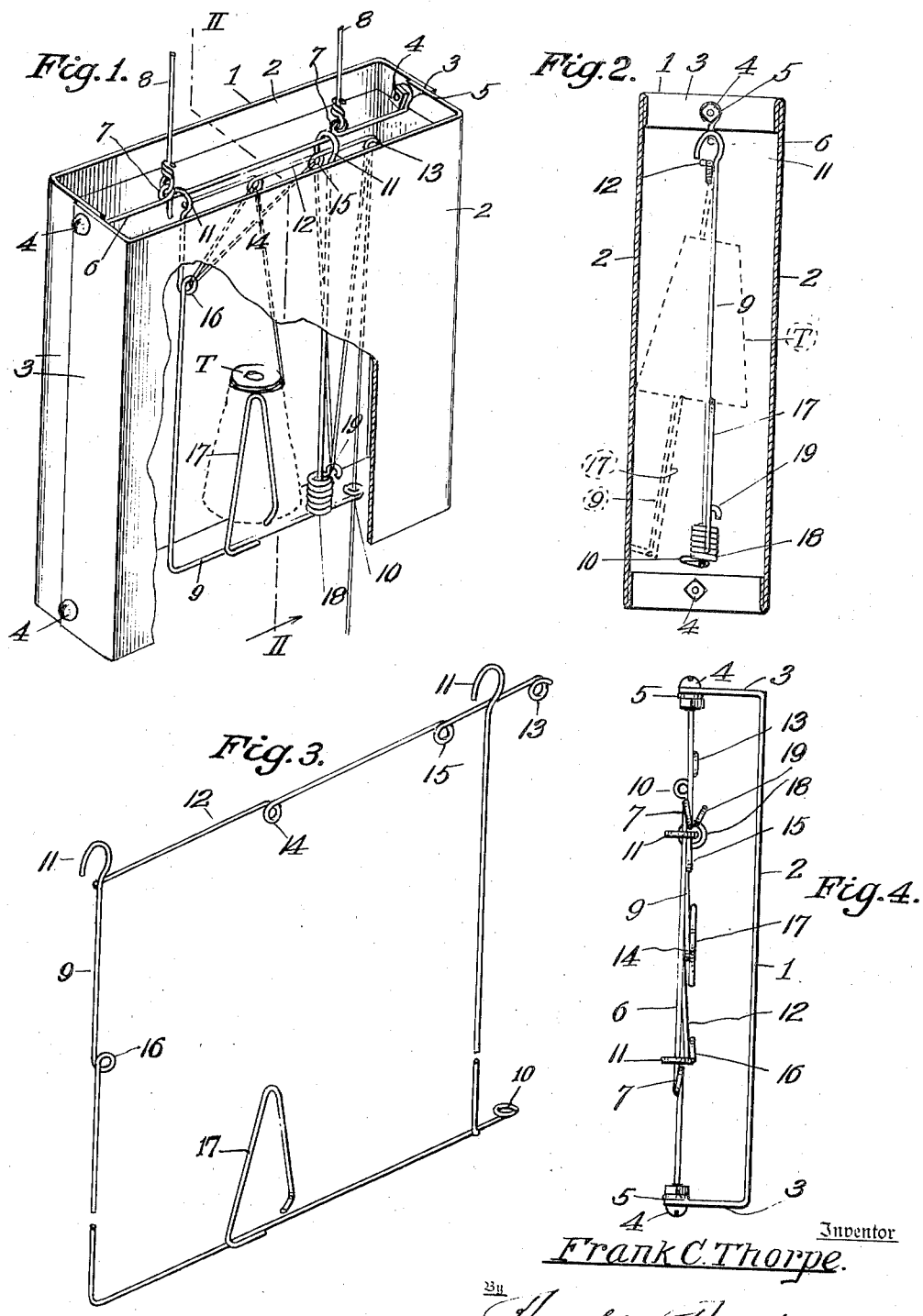
Inventor
Frank C. Thorpe
By Thorpe & Thorpe
Attorneys Patented Mar. 25, 1941

2,236,021

UNITED STATES PATENT OFFICE 2,236,021

TWINE CONE SUPPORT

Frank C. Thorpe, Lamar, Mo.

Application September 25, 1940, Serial No. 358,308

4 Claims. (Cl. 242—143)

This invention relates to twine holders and supports therefor, and has for its primary object, the provision of a suspended support on which advertisements can be displayed and which acts as a container or housing within which a ball of twine can be easily and quickly secured in or removed from position without disturbing the position of the container or housing. A structure of this character is highly desirable, particularly where the device is intended for suspension at some distance overhead.

Another object of the invention is to provide a structure of the character mentioned which is of simple, inexpensive and durable character, and is of attractive appearance.

With the general objects named in view and others as will hereinafter appear, the invention consists in certain novel and useful features of construction and combination of parts as hereinafter described and claimed; and in order that it may be fully understood, reference is to be had to the accompanying drawing, in which:

Figure 1 is a perspective view of a twine holder and support therefor, embodying the invention, the front wall of the support being broken away to clearly expose certain parts of the holder.

Figure 2 is a vertical section on the line II—II of Figure 1.

Figure 3 is an enlarged broken perspective view of the detachable twine holder, the cord or twine retrieving weight carried thereby being omitted.

Figure 4 is a top plan view of the twine holder as applied to a modified form of the support.

In the said drawing, 1 indicates a rectangular holder or container composed, in the preferred type, of two similar sheet metal or equivalent channel plates 2, the side flanges 3 of which overlap at their free edges and are bolted together at their upper and lower ends as at 4, the upper bolts extending also through off-set eyes 5, provided at opposite ends of a stiff horizontal rod 6, said eyes being interposed between the respective flanges and the nuts constituting parts of the upper bolt assemblies.

The rod at equal distances from the flanges is provided with widely-spaced upstanding eyes 7 as convenient non-shiftable points for the attachment of the lower ends of suitable overhead suspension means of any suitable type, such, for example, as wires 8.

The holder proper for a ball or cop of twine T, Figure 1, is in the form of a vertically elongated rectangular frame 9 of stiff wire. One upright side of the frame is integrally formed with the bottom of the frame, which bottom terminates beyond the other side of the frame in a horizontal eye 10, and both sides of the frame, which are spaced apart to fit snugly between the eyes 7 and thus prevent side slip, terminate above the top side of the frame in downwardly facing hooks 11 for hingedly and detachably engaging the rod 6.

The top 12 of the frame is welded to the upright sides thereof below the hooks of the latter and projects at one end beyond the same side thereof as the bottom and terminates in an eye 13. The top also has a central eye 14 and an eye 15 near the vertical side portion beyond which the top projects. The opposite side portion of the frame has an eye 16 at a point well above its middle, and in a substantially higher plane than an inverted V-shaped twine cone spring core 17, the latter being formed of wire, and welded or otherwise rigidly secured to and projecting upwardly from the bottom of the frame vertically below the eye 14. A slider 18 forming a retriever for the loose end of the cord or twine, may be composed of wire coiled loosely around that side of the frame between the core 17 and eye 10. Said retriever normally rests on the bottom of the frame and has a twine engaging eye 19 at its upper end.

The twine cop T of conventional type is adapted to be fitted on the spring core as indicated, and the strand of twine is threaded through eyes 14, 16, 15, 19, 13 and 10, in the order named, the free or lower end being conveniently accessible. Upon a pull on the twine, the retriever 18 slides upwardly and twine of about double the length of such movement is available for tying a package without withdrawing twine from the cop, it being obvious of course, that if a considerable length of twine is desired, it will unwind from the cop after the retriever has been arrested by abutment against the top of the frame. When the pull is removed, the retriever descends to its original position and elevates or withdraws the free end of the cord about double the length of such descent.

When a twine cop is used up, one can grasp the lower end of the frame and unhook it from the cross rod for convenience of lowering for replacement of the exhausted cop. In the event closed eyes are substituted for the hooks 11 to guard against detachment of the frame, the operator can swing the latter to the position shown in dotted lines, Figure 2, for ready removal of an exhausted cop and replacement by a new one.

All sides of the container may be utilized as an advertising matter display space. If the location of the structure is in a busy store for access by clerks at spaced stations or counters, it will be advantageous to have the holder of greater width, and the frame of substantially double width to accommodate two or more twine cops, certain parts shown and described, being necessarily multiplied, as will be readily understood.

In Figure 4 the support is composed of only one channel section for the purpose of disclosing the swing frame and cop. In other respects it corresponds to the construction already described and the corresponding parts are identified by the same reference characters.

From the above description it will be apparent that I have produced a construction embodying all of the features of advantage set forth as desirable, and while I have described and illustrated the preferred embodiment, it is to be understood that I reserve the right to all changes within the spirit of the invention and without the ambit of the prior art.

I claim:

1. A device of the character described, comprising a support, a horizontal cross rod carried by the support, a frame swingingly suspended from the cross rod and provided at its upper end with a series of guide eyes, a twine cop mounted on the swing frame with the twine extending through the guide eyes and its free end depending below the support, and a twine retriever for up and down movement on the same frame and provided with an eye through which the twine extends to and through a pair of guide eyes at the top of the frame.

2. A device of the character described comprising a support, a horizontal cross rod carried by and within the support, a frame within the support and detachably and swingingly suspended from the cross rod and provided at its upper end with a series of guide eyes, a twine cop mounted on the lower part of said frame with the twine extending through the guide eyes and its free end depending below the support, and a twine retriever for up and down movement on the said frame and provided with an eye through which the twine extends to and through a pair of guide eyes at the top of the frame.

3. In a device of the character described, the combination of an open bottom support, means for the suspension of the support, and a twine cop carrying frame detachably suspended within and from the upper part of the support and accessible for positioning and removing purposes, through the open bottom of said support.

4. In a device of the character described, the combination of an open bottom support, a cross rod spanning said support, and a twine cop carrying frame swingingly suspended from said rod in a plane above the open bottom of the support.

FRANK C. THORPE.